US011397802B2

(12) United States Patent
Howarth et al.

(10) Patent No.: US 11,397,802 B2
(45) Date of Patent: Jul. 26, 2022

(54) SYSTEMS AND METHODS FOR USER AUTHENTICATION IN NON-NETWORK-CONNECTED DEVICES (71) Applicant: ADVANCED NEUROMODULATION SYSTEMS, INC., Plano, TX (US)

(72) Inventors: Evan D. Howarth, Sachse, TX (US); Gregory Creek, Prosper, TX (US); Mai H. Nguyen, Plano, TX (US)

(73) Assignee: Advanced Neuromodulation Systems, Inc., Plano, TX (US)

( * ) Notice: Subject to any disclaimer, the term of this patent is extended or adjusted under 35 U.S.C. 154(b) by 148 days.

(21) Appl. No.: 16/572,393

(22) Filed: Sep. 16, 2019

(65) Prior Publication Data
US 2021/0081520 A1 Mar. 18, 2021

(51) Int. Cl.
G06F 21/42 (2013.01)
G06F 21/36 (2013.01)
H04L 9/32 (2006.01)
G06F 21/46 (2013.01)
H04L 9/08 (2006.01)

(52) U.S. Cl.
CPC ............ *G06F 21/42* (2013.01); *G06F 21/36* (2013.01); *G06F 21/46* (2013.01); *H04L 9/085* (2013.01); *H04L 9/3242* (2013.01); *G06F 2221/2103* (2013.01); *G06F 2221/2137* (2013.01)

(58) Field of Classification Search
CPC .......... G06F 21/42; G06F 21/36; G06F 21/46; G06F 2221/2103; G06F 2221/2137; H04L 9/3242; H04L 9/085; H04L 9/0662; H04L 9/3271
See application file for complete search history.

(56) References Cited

U.S. PATENT DOCUMENTS 7,181,762 B2   2/2007  Jerdonek
8,412,928 B1   4/2013  Bowness
8,601,264 B2 * 12/2013  Maj ...................... H04L 9/3273
                                                        713/168

(Continued)

OTHER PUBLICATIONS

NPL "WO 2021/257 664: Method and System for Secure Interoperability Between Medical Devices", by Fischer et al. (published Dec. 23, 2021, 39 pages) (Year: 2021).*

Primary Examiner — Oleg Korsak (57) ABSTRACT

The present disclosure provides systems and methods for authenticating a user to reset account login credentials associated with a non-network-connected generator computing device. The generator computing device is programmed to receive a first user input requesting to initiate a reset of account login credentials, generate a challenge code, set a timer, display the generated challenge code, and receive a second user input. The second user input is a response code generated at a services computing device associated with a services provider. The generator computing device is also programmed to verify that an amount of time elapsed between generation of the challenge code and receipt of the second user input is within a predefined time limit. The generator computing device is programmed to generate an expected response code, authenticate the user by comparing the received response code to the expected response code, and reset the account login credentials.

5 Claims, 7 Drawing Sheets (56) References Cited

U.S. PATENT DOCUMENTS

| | | | |
|---|---|---|---|
| 8,683,564 B2 | 3/2014 | Khan et al. | |
| 8,868,919 B2* | 10/2014 | Barton | G06F 21/36 |
| | | | 713/182 |
| 9,320,084 B2 | 4/2016 | Weiss et al. | |
| 9,532,222 B2* | 12/2016 | Oberheide | G06Q 20/401 |
| 9,768,963 B2* | 9/2017 | Chu | H04L 9/3228 |
| 9,980,140 B1* | 5/2018 | Spencer | H04W 12/02 |
| 10,395,008 B2* | 8/2019 | Gondek | G16H 10/60 |
| 2016/0294837 A1* | 10/2016 | Turgeman | G06F 3/04886 |
| 2017/0289153 A1* | 10/2017 | Raziel | H04L 9/0897 |
| 2019/0312734 A1* | 10/2019 | Wentz | H04L 9/3247 |

* cited by examiner

SYSTEMS AND METHODS FOR USER AUTHENTICATION IN NON-NETWORK-CONNECTED DEVICES

A. FIELD OF THE DISCLOSURE

The present disclosure relates generally to generating and distributing one-time passwords (OTPs) and, more specifically, to a system and method for authenticating a user initiating an account reset of a user account in a non-networked environment.

B. BACKGROUND ART

Devices that implement user accounts typically have an operational risk associated with users who forget their passwords, and users who are locked out of their accounts after exceeding a maximum number of login attempts. Staff turnover at a place of employment, such as, for example, a clinic or a hospital, may also result in a situation where the legal owner of a device, such as a medical device, has difficulty accessing the user accounts of individuals who have left their place of employment.

OTPs are commonly utilized in networked systems to enforce two-factor authentication. For example, in some known systems, a user who wants to reset his or her account login credentials may be asked to provide both their login password and a verification code. However, it is well known that security risks, such as data breaches, are associated with at least some of these networked systems. It is also known that security risks exist with the account reset procedures of some of these known networked systems. Thus, there exists a need for an OTP-based account reset procedure for non-network-connected devices, such as stand-alone non-network-connected medical devices (e.g., medical equipment) that have sensitive patient data stored thereon.

Accordingly, a process for secure generation and distribution of OTPs to enable account resets in a non-networked environment is desirable. Such a process is desirable to provide an authorized user of a device, such as a legal owner of a medical device, the ability to securely regain privileged access to data stored on the device while ensuring that the reset feature of the device cannot be abused by unauthorized individuals to gain access to the data stored at the device.

BRIEF SUMMARY OF THE DISCLOSURE

In one embodiment, the present disclosure is directed to a computer-implemented method for authenticating a user to reset account login credentials associated with a non-network-connected generator computing device using an authentication system. The authentication system includes the generator computing device and a services computing device associated with a service provider. The generator computing device is in communication with a memory. The method includes receiving, at the generator computing device, from the user, a first user input to initiate a reset of the account login credentials. The method also includes generating, by the generator computing device, in response to the first user input, a challenge code. The method also includes setting, by the generator computing device, a timer associated with the generated challenge code.

The method further includes displaying, by the generator computing device, the generated challenge code on a graphical user interface at the generator computing device. The method also includes receiving, at the generator computing device, from the user, a second user input. The second user input is a response code generated at the services computing device. The method also includes verifying, by the generator computing device, using the timer, that an amount of time elapsed between generation of the challenge code and receipt of the second user input is within a predefined time limit. The method also includes generating, by the generator computing device, in response to the verification, an expected response code using the generated challenge code and a secret key stored in the memory. The method also includes authenticating, by the generator computing device, the user by comparing the received response code to the expected response code. The method also includes resetting, by the generator computing device, based on the authentication, the account login credentials.

In another embodiment, the present disclosure is directed to an authentication system for authenticating a user to reset account login credentials associated with a non-network-connected generator computing device. The authentication system comprises the generator computing device. The generator computing device is in communication with a memory. The generator computing device is programmed to receive, from the user, a first user input requesting to initiate a reset of the account login credentials. The generator computing device is programmed to generate, in response to the first user input, a challenge code. The generator computing device is programmed to set a timer associated with the generated challenge code. The generator computing device is also programmed to display the generated challenge code on a graphical user interface at the generator computing device.

The generator computing device is also programmed to receive, from the user, a second user input. The second user input is a response code generated at a services computing device associated with a services provider. The generator computing device is programmed to verify, using the timer, that an amount of time elapsed between generation of the challenge code and receipt of the second user input is within a predefined time limit. The generator computing device is programmed to generate, in response to the verification, an expected response code using the generated challenge code and a secret key stored in the memory. The generator computing device is programmed to authenticate the user by comparing the received response code to the expected response code. The generator computing device is also programmed to reset, based on the authentication, the account login credentials.

In another embodiment, the present disclosure is directed to non-transitory computer-readable storage media for authenticating a user to reset account login credentials associated with a non-network-connected generator computing device. The computer-readable storage media has a first set of computer-executable instructions embodied thereon for execution by the generator computing device. When executed by the generator computing device, the first set of computer-executable instructions causes the generator computing device to receive, from the user, a first user input to initiate a reset of the account login credentials. The first set of computer-executable instructions further causes the generator computing device to generate, in response to the first user input, a challenge code. The first set of computer-executable instructions further causes the generator computing device to set a timer associated with the generated challenge code.

The first set of computer-executable instructions further causes the generator computing device to display the generated challenge code on a graphical user interface at the generator computing device. The first set of computer-executable instructions further causes the generator computing device to receive, from the user, a second user input. The second user input is a response code generated at a services computing device associated with a services provider. The first set of computer-executable instructions further causes the generator computing device to verify, using the timer, that an amount of time elapsed between generation of the challenge code and receipt of the second user input is within a predefined time limit. The first set of computer-executable instructions further causes the generator computing device to generate an expected response code using the generated challenge code and a secret key stored in a memory. The first set of computer-executable instructions further causes the generator computing device to authenticate the user by comparing the received response code to the expected response code. The first set of computer-executable instructions further causes the generator computing device to reset, based on the authentication, the account login credentials.

The foregoing and other aspects, features, details, utilities and advantages of the present disclosure will be apparent from reading the following description and claims, and from reviewing the accompanying drawings.

BRIEF DESCRIPTION OF THE DRAWINGS

Corresponding reference characters indicate corresponding parts throughout the several views of the drawings.

DETAILED DESCRIPTION OF THE DISCLOSURE

The present disclosure provides systems and methods for authenticating a user for resetting user account login credentials associated with a generator computing device. The generator computing device is a stand-alone non-network-connected computing device that has sensitive data stored thereon (e.g., protected health information). The generator computing device may be a medical device (e.g., medical equipment) utilized in a clinical or hospital environment. The generator computing device implements user accounts (e.g., user names and passwords) to control user access to sensitive patient data and privileged functions. Thus, only authorized users, such as, for example, doctors and nurses, may have permission to access this data and reset user account login credentials.

The generator computing device enforces user access control and authentication using a local user database, as the generator computing device has no connections to other systems or networks. A secure process for generating and distributing one-time passwords (OTPs) for non-network-connected computing devices is described herein. In particular, this secure process utilizes an authenticated hash to generate a time-bound OTP reset code (e.g., a response code) that a user may input into the generator computing device to authorize an account reset of a username and/or password. This process is protected from spoofing by utilizing a shared secret key stored at both the generator computing device and at a services computing device, as explained below.

This shared secret key cannot be reverse engineered from source code and is only stored in an encrypted form at both the generator computing device and at the services computing device. This shared secret key is not transmitted between the generator computing device and the services computing device. Further, the shared secret key is never transmitted in plaintext form. Each response code is valid only once and only for one generator computing device. Response codes can only be used for a designated period of time to prevent future use by an attacker, and to ensure that a stale response code cannot be used to gain access to data stored at the generator computing device.

Response codes are provided to a user by a services representative using out-of-band communication. More specifically, the services representative may provide a response code to the user using a pre-registered email address and/or phone number associated with the user. Out-of-band communication is utilized to ensure that in the event the generator computing device is stolen, the perpetrator will not have access to the response code, and furthermore, the data stored at the generator computing device will not be compromised.

Figure 1A:
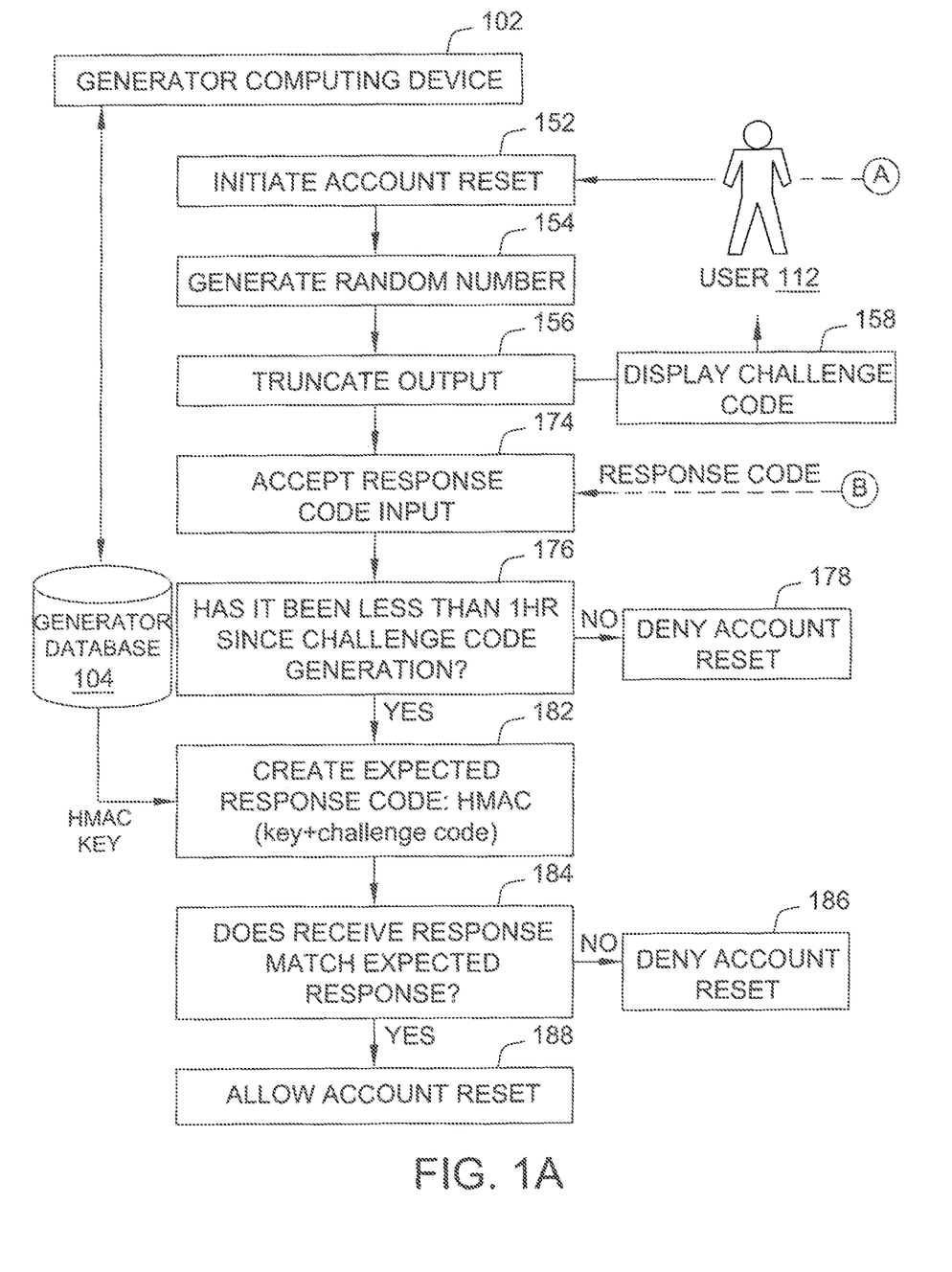
FIGS. 1A and 1B area flow diagram of one embodiment of an authentication process using an authentication system.
Figure 1B:
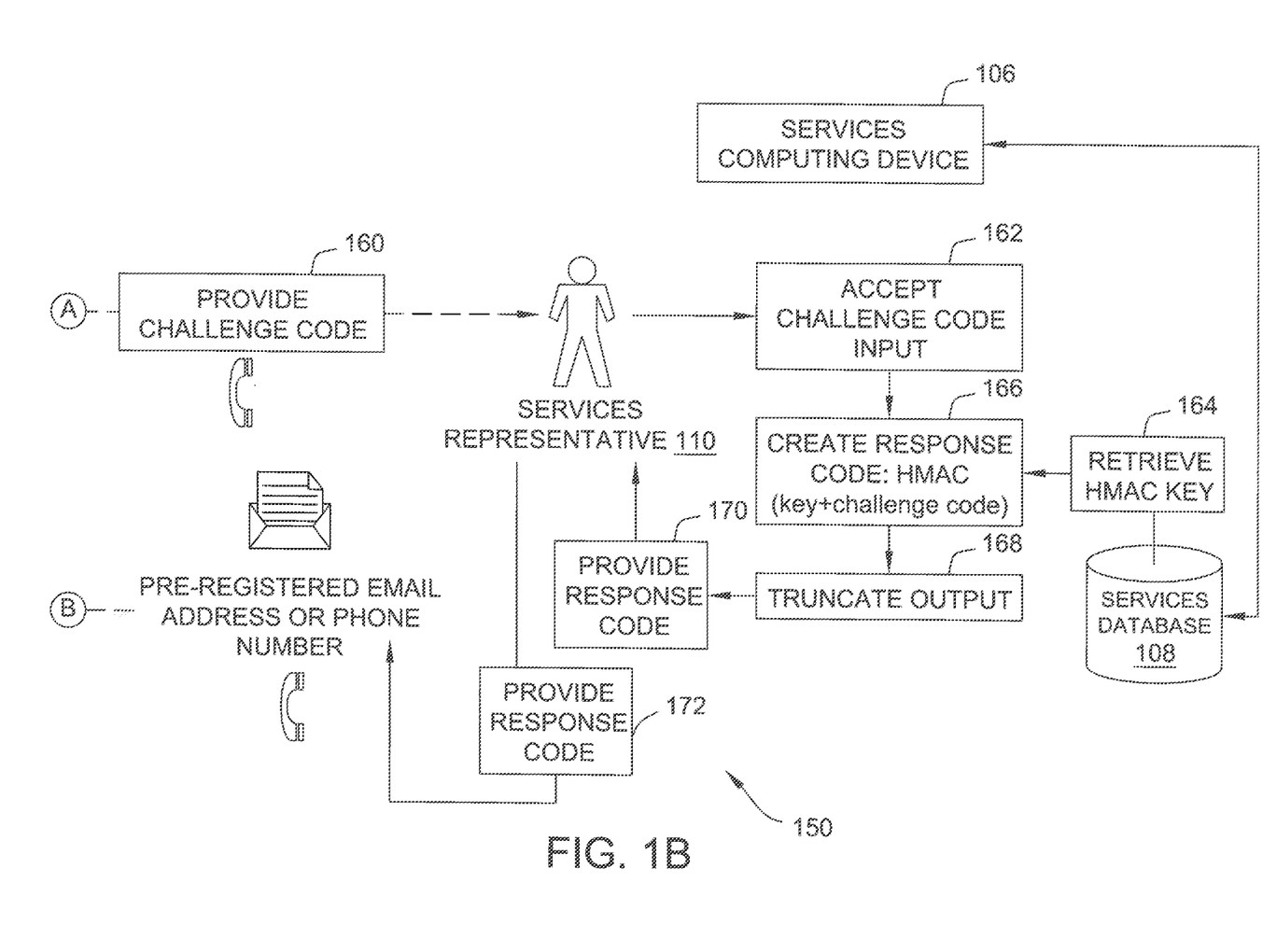

Referring now to the drawings, FIGS. 1A and 1B illustrate a flow diagram of an authentication process 150 for resetting user account login credentials using one embodiment of an authentication system 100. System 100 includes, among other components; a generator computing device 102, a generator database 104, a services computing device 106, and a services database 108. Generator computing device 102 includes at least one processor 202 in communication with a memory 204 (both shown in FIG. 2). Services computing device 106 is associated with a manufacturer or a service provider that services generator computing device 102. As will be described below, in authentication process 150, a services representative 110 utilizes services computing device 106 to assist a user 112 with resetting user account login credentials associated with generator computing device 102. System 100 may additionally include a user computing device 502 (shown in FIG. 5) associated with user 112.

As illustrated in authentication process 150 of FIGS. 1A and 1B, user 112 initiates 152 an account reset at generator computing device 102. In this embodiment, generator computing device 102 displays an "account reset" option configured to enable user 112 to initiate an account reset. Privileged functions, such as software updates, as well as sensitive patient data, such as, for example, personal identifying information (PII), patient medical treatment, and patient medical history are stored in memory 204 of generator computing device 102.

In response to user 112 initiating 152 an account reset, generator computing device 102 generates 154 a unique random value using a random number generator. Generator computing device 102 truncates 156 the unique random value output to six digits. Generator computing device 102 displays 158 the truncated six digit output to user 112 as a challenge code. Additionally, generator computing device 102 is configured to start an electronic timer at the time of generating the challenge code to measure an amount of time that passes between generator computing device 102 generating the challenge code and user 112 subsequently inputting a response code, as described herein. The electronic timer may be, for example, a watchdog timer. In some embodiments, generator computing device 102 is configured to start the electronic timer when the challenge code is displayed to user 112. In these embodiments, generator computing device 102 measures the amount of time that passes between generator computing device 102 displaying the challenge code and user 112 subsequently inputting the response code.

With continued reference to FIGS. 1A and 1B, user 112 provides 160 the challenge code to services representative (e.g., a customer support representative) 110. For example, user 112 may call services representative 110 to provide the challenge value generated by generator computing device 102. In other embodiments, user 112 may utilize other methods of communication to provide the challenge value to services representative 110. Services representative 110 is generally a party that assists in the troubleshooting and/or repair of generator computing device 102. For example, generator computing device 102 may be a medical device (e.g., medical equipment), such as a medical device for providing neuro-ablation therapy to patients. In this example, user 112 may call a technical support phone number associated with generator computing device 102 to provide a challenge code to services representative 110.

Services representative 110 may be a sales representative or a technology services representative associated with this medical device. In other embodiments, services representative 110 is associated with a distributor, retailer, and/or a third party entity that is otherwise authorized to assist with resetting account login credentials associated with generator computing device 102.

In this embodiment, after receiving the challenge code from user 112, services representative 110 inputs the challenge code into services computing device 106. Services computing device 106 is configured to generate a response code in response to receiving the challenge code. Services computing device 106 may include an app (e.g., a software application) provided by a manufacturing server (not shown) that enables services computing device 106 to generate response codes. The manufacturing server may be associated with a manufacturer of generator computing device 102. The software application may be stored in memory 304 of services computing device 106 for execution by one or more processors of services computing device 106 to generate the response code. In authentication process 150, services computing device 106 accepts 162 the challenge code inputted by services representative 110. Subsequently, services computing device 106 retrieves 164 a hash-based message authentication code (HMAC) pre-programmed secret key from services database 108.

Services computing device 106 is interconnected to the Internet through one or more interfaces including a network, such as a local area network (LAN) or a wide area network (WAN), dial-in-connections, cable modems, and special high-speed Integrated Services Digital Network (ISDN) lines. Services computing device 106 may be a mobile computing device, such as a laptop or desktop computer, a web-based phone (e.g., a "smartphone"), a personal digital assistant (PDA), a phablet, or a tablet computing device (e.g., an IPAD® or SURFACE®).

As shown in FIGS. 1A and 1B, services computing device 106 creates 166 a response code using an authenticated hash of the retrieved secret key and the inputted challenge code. The response code is a time-based one-time password (TOTP). In particular, the response code is a temporary passcode that user 112 can enter into generator computing device 102 to authorize reset of administrative account login credentials. In this embodiment, an HMAC of the pre-programmed secret key is combined with the challenge code, and the time step parameter of the TOTP function is ignored. Services computing device 106 subsequently truncates 168 this output to six digits. This truncated output serves as the response code. Each response code generated by services computing device 106 is valid only once for one specific generator computing device 102 because of the unique random challenge number used in the TOTP HMAC function.

In authentication process 150, services computing device 106 provides 170 the response code to services representative 110. Services representative 110 subsequently provides 172 the response code to user 112 using an out-of-band communication. In this embodiment, services representative 110 may use a pre-registered email address and/or phone number associated with user 112 to transmit the response code out-of-band. For example, services representative 110 may use an email address and/or phone number that was provided by a clinic at the time that the clinic purchased generator computing device 102. Services representative 110 may call user 112 using the pre-registered phone number to provide the response code. In another example, services representative 110 may send a short message service (SMS) message (e.g., text message) with the response code to the pre-registered phone number.

In further embodiments, services representative 110 may additionally utilize question-and-answer based cognitive passwords to verify the identity of user 112 when providing user 112 with the response code. In these embodiments, instead of directly providing the response code to user 112, services representative 110 may first ask a challenge question, such as, "where were you born?" to verify the identity of user 112. Based on the answer received from user 112, services representative 110 may decide whether or not to provide the response code generated by services computing device 106. Cognitive passwords may be stored at services database 108.

In this embodiment, user 112 inputs the response code at generator computing device 102, and generator computing device 102 accepts 174 the inputted response code. Generator computing device 102 subsequently utilizes the electronic timer to determine whether the amount of time elapsed between generation of the challenge code and input of the response code exceeds a predefined time limit (e.g., time period). The predefined time limit can be any suitable time period (e.g., 6 hours, 12 hours, 30 minutes). As shown in FIGS. 1A and 1B, in this embodiment, the predefined time limit is sixty minutes. Thus, generator computing device 102 determines 176 whether it has been less than one hour since generator computing device 102 generated the challenge code. If more than sixty minutes have elapsed between generation of the challenge code and input of the response code, generator computing device 102 denies 178 the account reset, and user 112 cannot proceed with resetting the user account login credentials.

With continued reference to FIGS. 1A and 1B, if less than sixty minutes have passed between generation of the challenge and input of the response code, generator computing device 102 retrieves 180 a pre-programmed secret key from generator database 104, and creates 182 an expected response code. More specifically, generator computing device 102 performs an HMAC of the pre-programmed secret key combined with the challenge code (with the time step parameter of the TOTP function similarly ignored) to calculate the expected response code. This expected response code generation process is the same as the response code generation process performed by services computing device 106. The pre-programmed secret key is the same key previously used by services computing device 106, and is shared between generator computing device 102 and services computing device 106 (e.g., during the initial programming of generator computing device 102).

In authentication process 150, as shown in FIGS. 1A and 1B, generator computing device 102 determines 184 whether the response code generated by services computing device 106 matches the expected response code generated by generator computing device 102. If the expected response code does not match the received response code, generator computing device 102 denies 186 the account reset, and user 112 cannot proceed with resetting user account login credentials. In this embodiment, generator computing device 102 authenticates user 112 to user account login credentials associated with generator computing device 102 when both (i) the expected response matches the received response code, and (ii) no more than sixty minutes have elapsed between generation of the challenge code and input of the response code. Thus, upon authenticating user 112, generator computing device 102 allows 188 user 112 to reset the pertinent account username and/or password.

Figure 2:
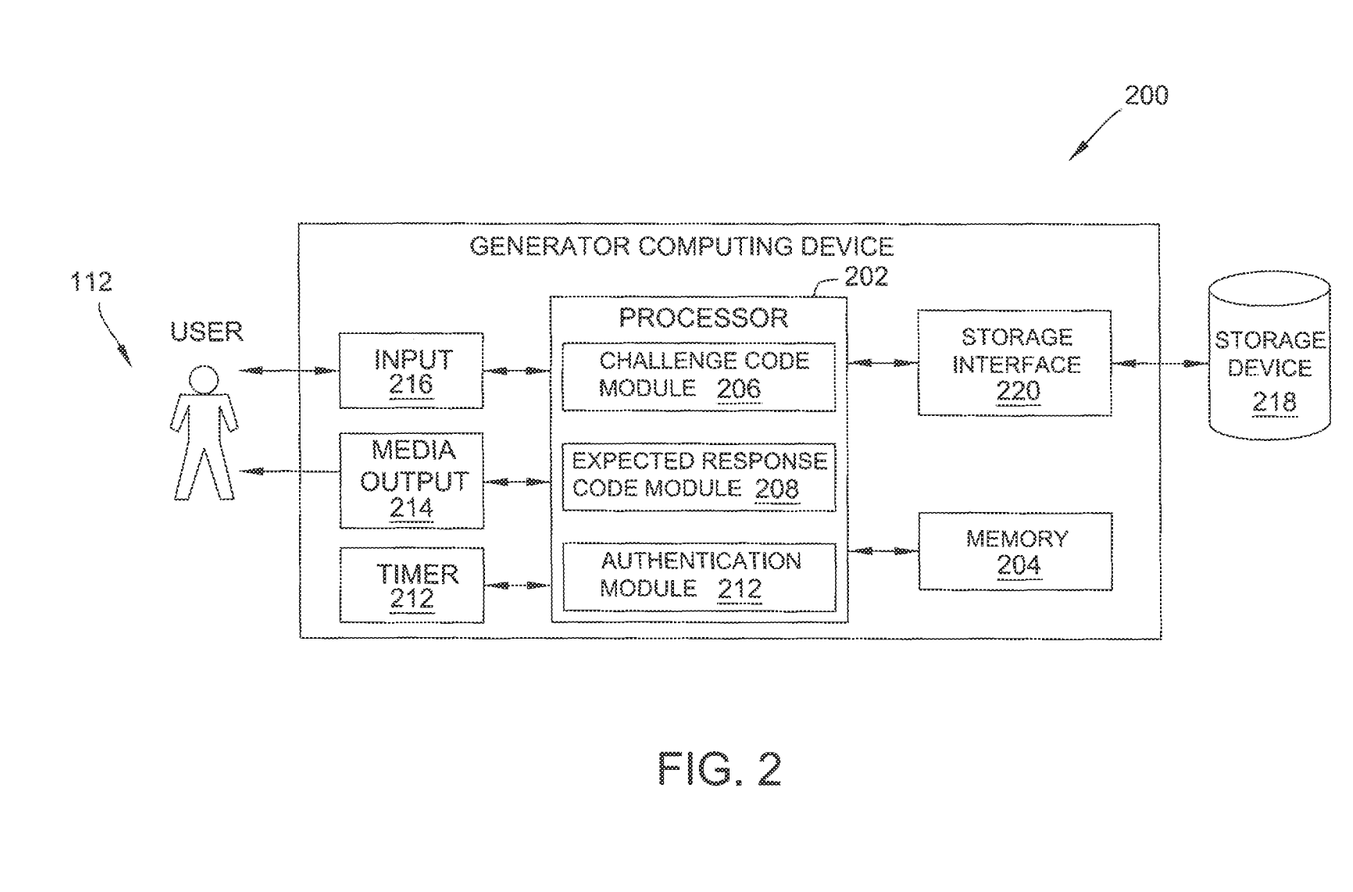
FIG. 2 is one embodiment of a configuration of a generator computing device of the authentication system shown in FIGS. 1A and 1B.

FIG. 2 illustrates an exemplary configuration 200 of generator computing device 102 (shown in FIGS. 1A and 1B) in accordance with one embodiment of the present disclosure. Generator computing device 102 includes a processor 202 for executing instructions. Instructions may be stored in a memory area 204, for example. Processor 202 may include one or more processing units (e.g., in a multi-core configuration) configured to authenticate a user requesting to reset account login credentials by, for example, generating challenge codes and expected response codes, as shown in FIGS. 1A and 1B.

In this embodiment, processor 202 is operable to execute modules, such as a challenge code module 206, an expected response code module 208, and an authentication module 210. Modules 206, 208, and 210 may include specialized instruction sets and/or coprocessors. In this embodiment, challenge code module 206 is utilized to generate a challenge code in response to user 112 (shown in FIGS. 1A and 1B) initiating an account reset. Challenge code module 206 may comprise a random number generator or a randomizer module (not shown) configured to generate a random number. Additionally or alternatively, challenge code module 206 may be configured to truncate the generated random number to a preset number of digits, such as six digits.

Expected response code module 208 is utilized to generate an executed response code in response to an input response code provided by user 112, as described in FIGS. 1A and 1B. Authentication module 210 is utilized to determine whether an expected response code matches a received response code, and whether the amount of time that has elapsed between generation of a challenge code and input of the response code is less than sixty minutes.

Processor 202 is operatively coupled to an electronic timer 212 such that generator computing device 102 is capable of measuring the amount of time that elapses between generating a challenge code and receiving an input response code. Electronic timer 212 may be a watchdog timer (e.g., a computer operating properly (COP) timer).

Processor 202 is operatively coupled to at least one media output component 214 for presenting information to user 112. For example, media output component 214 may cause generator computing device 102 to display a graphical user interface including an account reset option and a challenge code to user 112. Media output component 214 is any component capable of conveying information to user 112. In some embodiments, media output component 214 includes an output adapter such as a video adapter and/or an audio adapter. An output adapter is operatively coupled to processor 202 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 214 is configured to present an interactive user interface (e.g., a web browser or client application) to user 112.

In some embodiments, generator computing device 102 includes an input device 216 for receiving input, such as a response code, from user 112. Input device 216 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 214 and input device 216.

Processor 202 may also be operatively coupled to a storage device 218. Storage device 218 is any computer-operated hardware suitable for storing and/or retrieving data. For example generator database 104 may be implemented on storage device 218. In some embodiments, storage device 218 is integrated in generator computing device 102. For example, generator computing device 102 may include one or more hard disk drives as storage device 218. In other embodiments, storage device 218 is external to generator computing device 102 and may be accessed by a plurality of computing devices. For example, storage device 218 may include multiple storage units such as hard disks or solid state disks in a redundant array of inexpensive disks (RAID) configuration. Storage device 218 may include a storage area network (SAN) and/or a network attached storage (NAS) system.

In some embodiments, processor 202 is operatively coupled to storage device 218 via a storage interface 220. Storage interface 220 is any component capable of providing processor 202 with access to storage device 218, such that expected response code module 208 is capable of communicating with generator database 104 (shown in FIGS. 1A and 1B) to retrieve the pre-programmed secret key. Storage interface 220 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to storage device 218.

Figure 3:
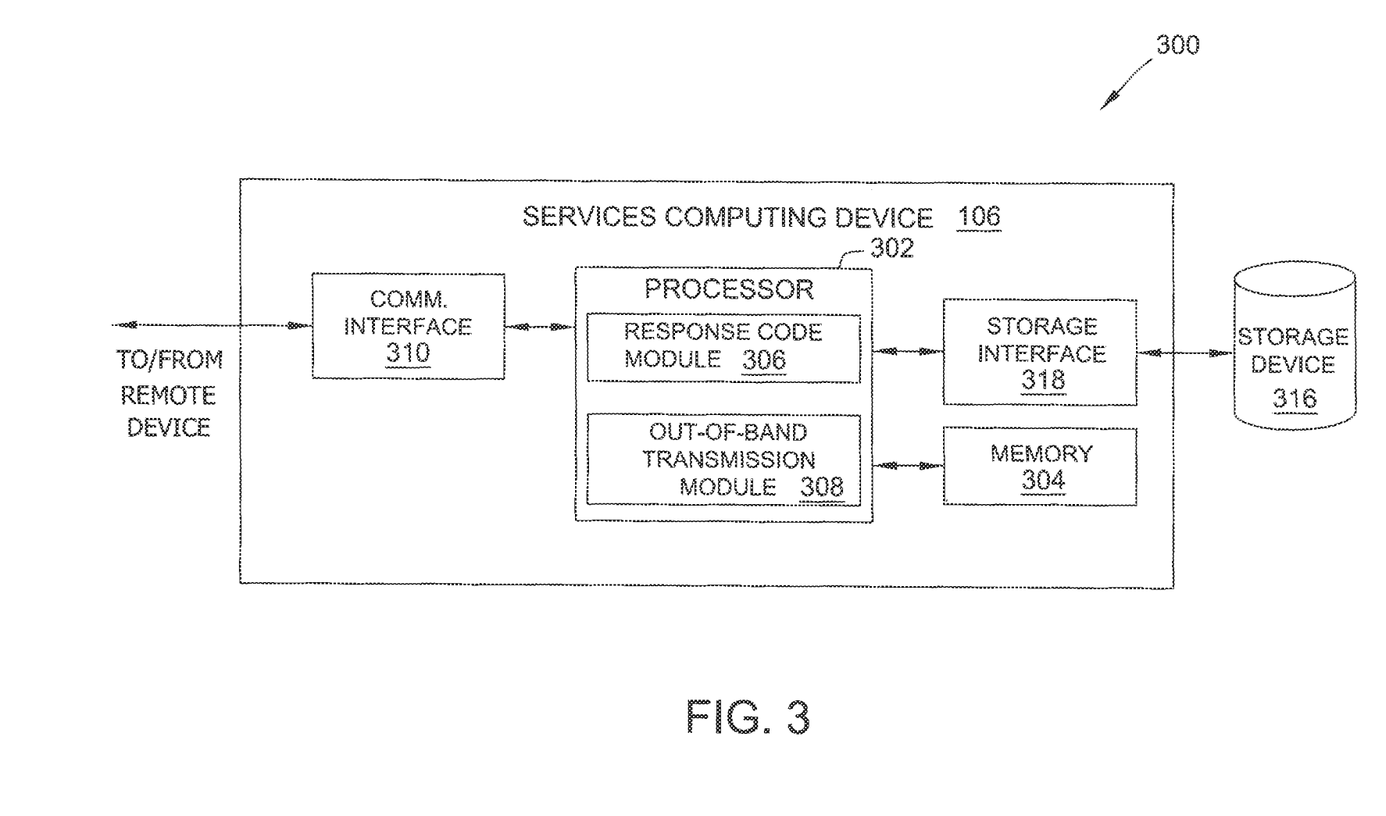
FIG. 3 is one embodiment of a configuration of a services computing device of the authentication system shown in FIGS. 1A and 1B.

FIG. 3 illustrates an exemplary configuration 300 of services computing device 106 (shown in FIGS. 1A and 1B) in accordance with one embodiment of the present disclosure. Services computing device 106 includes a processor 302 for executing instructions. Instructions may be stored in a memory area 304, for example. Processor 302 may include one or more processing units (e.g., in a multi-core configuration) configured to generate a response code, as shown in FIGS. 1A and 1B.

In this embodiment, processor 302 is operable to execute modules, such as response code module 306 and out-of-band transmission module 308. Modules 306 and 308 may include specialized instruction sets and/or coprocessors. In this embodiment, response code module 306 is utilized to generate a response code in response to services representative 110 inputting a challenge code generated by generator computing device 102. Response code module 306 may be configured to retrieve a pre-programmed secret key from services database 108. Response code module 306 may also be configured to utilize an authenticated hash to generate a response code, as described above. Out-of-band transmission module 308 is utilized to transmit a response code to user 112 (shown in FIGS. 1A and 1B). Out-of-band transmission module 308 may be configured to perform a look up of user 112 in a user directory (not shown) to determine a pre-registered email address and/or phone number associated with user 112.

Figure 5:
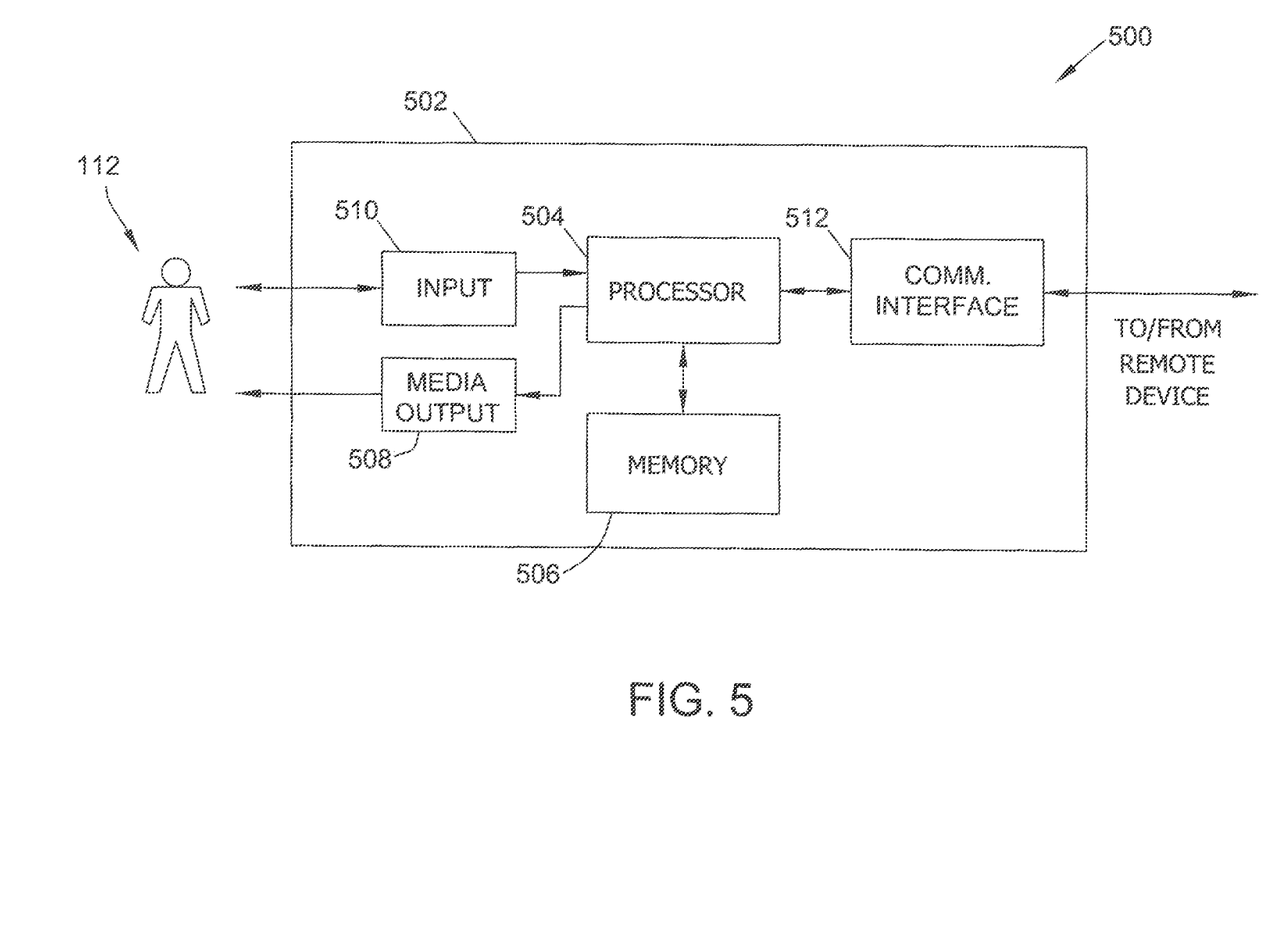
FIG. 5 is one embodiment of a configuration of a client computer device for use by a user in the authentication system shown in FIGS. 1A and 1B.

Processor 302 is operatively coupled to a communication interface 310 such that services computing device 106 is capable of communicating with a remote device such as one or more user computing devices 502 (shown in FIG. 5). For example, communication interface 310 may transmit a response code to user computing device 502 associated with user 112 to enable user 112 to input the response code at generator computing device 102.

Processor 302 may also be operatively coupled to a storage device 316. Storage device 316 is any computer-operated hardware suitable for storing and/or retrieving data. For example services database 108 may be implemented on storage device 316. In some embodiments, storage device 316 is integrated in services computing device 106. For example, services computing device 106 may include one or more hard disk drives as storage device 316. In other embodiments, storage device 316 is external to services computing device 106 and may be accessed by a plurality of computing devices. For example, storage device 316 may include multiple storage units such as hard disks or solid state disks in a redundant array of inexpensive disks (RAID) configuration. Storage device 316 may include a storage area network (SAN) and/or a network attached storage (NAS) system.

In some embodiments, processor 302 is operatively coupled to storage device 316 via a storage interface 318. Storage interface 318 is any component capable of providing processor 302 with access to storage device 316, such that response code module 308 is capable of communicating with services database 108 (shown in FIGS. 1A and 1B) to retrieve the pre-programmed secret key. Storage interface 318 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 316.

Memory areas 204 and 304 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 4A:
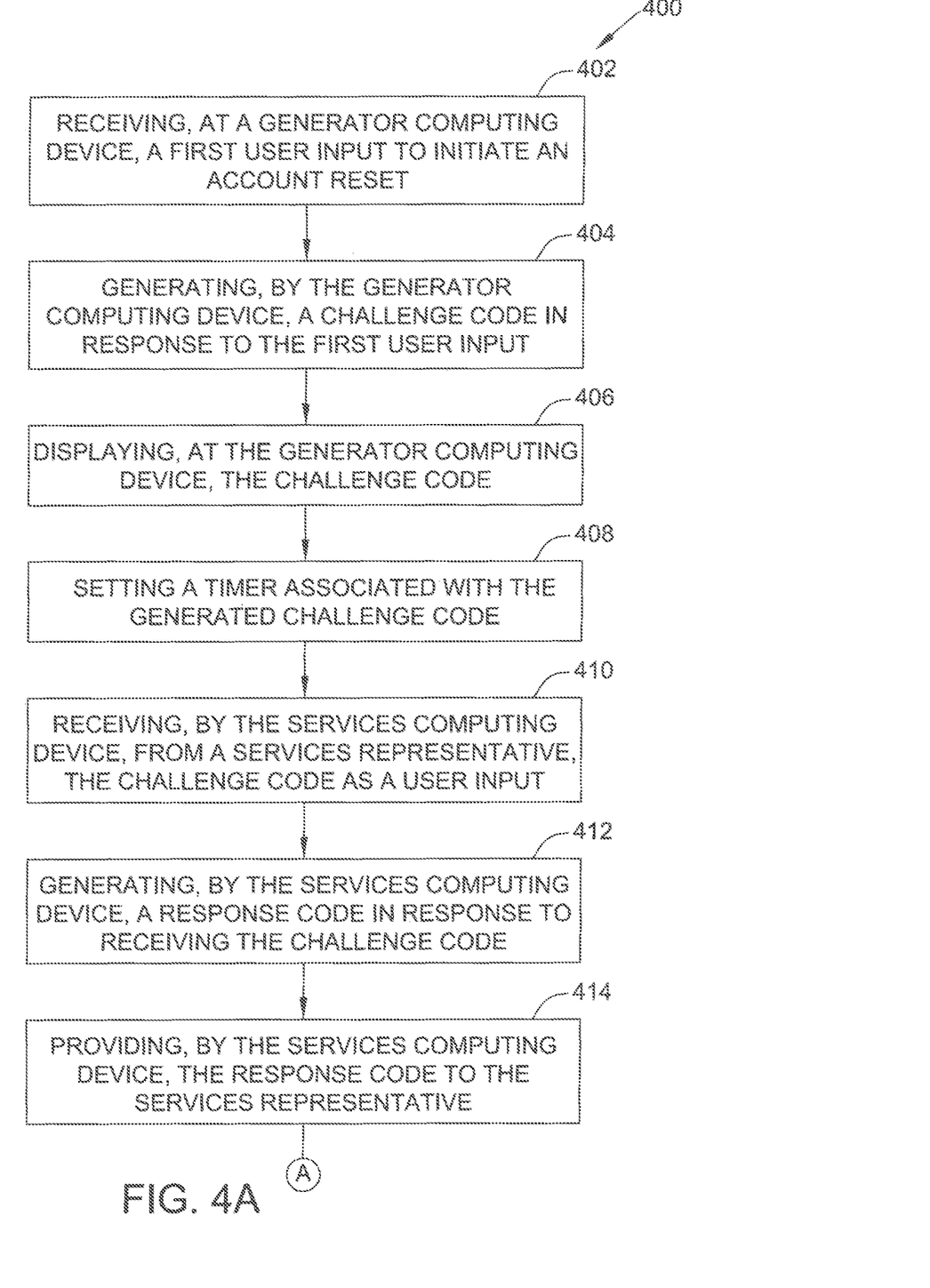
FIGS. 4A and 4B area flowchart of one embodiment of a process for authenticating a user using the authentication system shown in FIGS. 1A and 1B.
Figure 4B:
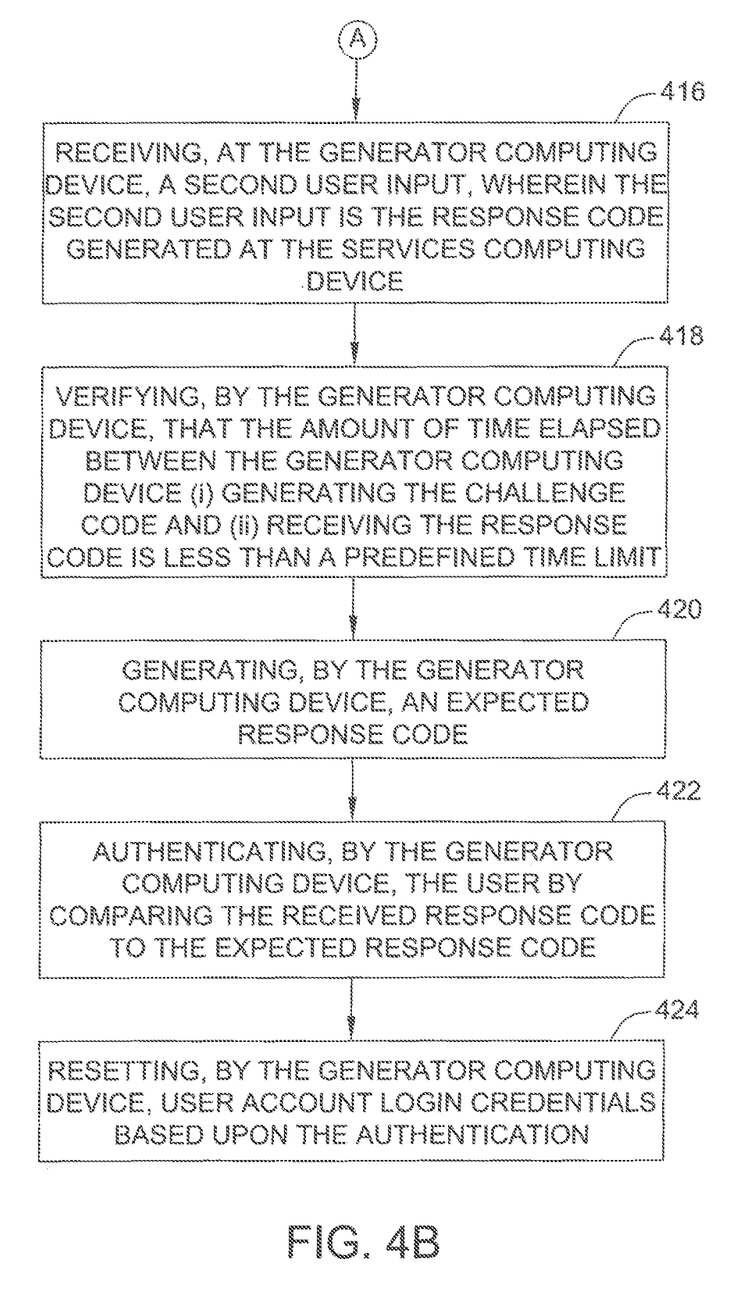

FIGS. 4A and 4B are a flow chart of an exemplary process 400 for authenticating user 112 for resetting account login credentials associated with generator computing device 102 using authentication system 100 (all shown in FIGS. 1A and 1B).

In the illustrated embodiment, process 400 includes receiving 402, at generator computing device 102, a first user input to initiate an account reset. For example, user 112 may initiate a reset of an administrator account by selecting a "forgot my password" option displayed on generator computing device 102. Process 400 also includes generating 404, by generator computing device 102, a challenge code in response to receiving the first user input. Generator computing device 102 may generate a unique random value using a random number generator (not shown), and truncate the unique random value to a predefined number of digits to generate the challenge code. Generator computing device 102 may truncate the unique random value to six digits, and designate the six digits as the challenge code.

Process 400 also includes displaying 406, at generator computing device 102, the challenge code. Process 400 also includes setting 408 a timer associated with the generated challenge code. For example, generator computing device 102 may initiate an electronic timer. This enables generator computing device 102 to later verify that no longer than, for example, sixty minutes have passed between generator computing device 102 issuing the challenge code and user 112 inputting the response code.

Process 400 also includes receiving 410, by services computing device 106, from services representative 110, the challenge code as a user input (both shown in FIGS. 1A and 1B). Process 400 includes generating 412, by services computing device 106, a response code in response to receiving the challenge code. Services computing device 106 generates the response code by performing an HMAC of a shared secret key combined with the challenge code. The time step parameter of the TOTP function is ignored. Services computing device 106 truncates the HMAC output to a predefined number of digits, such as six digits, which serves as the response code.

Process 400 also includes providing 414, by services computing device 106, the response code to services representative 110. Services representative 110 utilizes out-of-bound communication to provide user 112 with the response code. Services representative 110 may perform a look up of a registered email address and/or phone number associated with user 112 in services database 108. The registered phone number may be different from the phone number utilized by user 112 to call services representative 110 to provide the challenge code.

Process 400 further includes receiving 416, at generator computing device 102, a second user input. The second user input is the response code generated at services computing device 106. Process 400 also includes verifying 418, by generator computing device 102, that the amount of time elapsed between generator computing device 102 generating the challenge code and generator computing device 102 receiving the response code is less than the predefined time limit. For example, generator computing device 102 may verify that it has been less than sixty minutes since the challenge code was originally created.

Process 400 also includes generating 420, by generator computing device 102, an expected response code. Generator computing device 102 is configured to perform the same HMAC process performed earlier by services computing device 106. Like the process performed by services computing device 106, generator computing device 102 also ignores the time step parameter of the TOTP function when calculating the expected response code.

Process 400 also includes authenticating 422, by generator computing device 102, user 112 by comparing the received response code to the expected response code. User 112 is authenticated if the expected response code matches the received response code, and if the time elapsed between generating the challenge code and receiving the response code is within the predefined time limit. Process 400 includes resetting 424, by generator computing device 102, user account login credentials when user 112 is authenticated. For example, generator computing device 102 allows user 112 to reset his or her user account login credentials if the expected response code matches the received response code, and less than sixty minutes has passed between generator computing device 102 issuing the challenge code and generator computing device 102 receiving the response code.

FIG. 5 illustrates an exemplary configuration 500 of a user computing device 502, in accordance with one embodiment of the present disclosure. User computing device 502 is operated by user 112. Computing device 502 includes a processor 504 for executing instructions. In some embodiments, executable instructions are stored in a memory area 506. Processor 504 may include one or more processing units (e.g., in a multi-core configuration). Memory area 506 is any device allowing information such as executable instructions and/or other data to be stored and retrieved. Memory area 506 may include one or more computer-readable media.

User computing device 502 also includes at least one media output component 508 for presenting information to user 112. For example, media output component 508 may cause user computing device 502 to display a response code generated by services computing device 106 (shown in FIGS. 1A and 1B). Media output component 508 is any component capable of conveying information to user 112. In some embodiments, media output component 508 includes an output adapter such as a video adapter and/or an audio adapter. An output adapter is operatively coupled to processor 504 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 508 is configured to present an interactive user interface (e.g., a web browser or client application) to user 112.

In some embodiments, user computing device 502 includes an input device 510 for receiving input from user 112. Input device 510 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 508 and input device 510.

Computing device 502 may also include a communication interface 512, which is communicatively coupleable to a remote device. Communication interface 512 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 506 are, for example, computer-readable instructions for providing a user interface to user 112 via media output component 508 and, optionally, receiving and processing input from input device 510. A user interface may include, among other possibilities, a web browser and/or a client application capable of generating a user interface transmitted by, for example, services computing device 106. Web browsers enable users 112 to display and interact with media and other information typically embedded on a web page or a website from a web server. Instructions may be stored by a cloud service and the output of the execution of the instructions sent to media output component 508.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality. The following detailed description illustrates embodiments of the disclosure by way of example and not by way of limitation. It is contemplated that the disclosure has general application to providing a computer-implemented method for authenticating a user for resetting user account login credentials associated with a non-network-connected stand-alone device.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal"

refers to any signal used to provide machine instructions and/or data to a programmable processor.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

When Introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A method of operating a medical device in a health care system by a user that is authorized to operate the medical device within the health care system according user credentials defined in the health care system, wherein the health care system includes devices having networked-connected (NC) devices and wherein the medical device is a non-networked-connected (NNC) device, comprising:
    receiving first input by the medical device from a user to reset login credentials for the medical device according to user credentials of the user issued by the health care system;
    generating, by the medical device, in response to the first user input, a challenge code;
    setting, by the medical device, a timer associated with the generated challenge code;
    displaying, by the medical device, the generated challenge code on a graphical user interface of the medical device;
    receiving, at a services computing device, the challenge code generated by the medical device; and generating, by the services computing device, a response code in response to receiving the challenge code using a shared secret key;
    receiving the response code by a NC device via an out-of-band email communication to an email address for the user corresponding to the user's credentials in a user directory of the health care system;
    receiving second input from the user by the medical device;
    verifying, by the medical device, using the timer, that an amount of time elapsed between generation of the challenge code and receipt of the second user input is within a predefined time limit;
    generating, by the medical device, in response to the verification, an expected response code using the generated challenge code and the shared secret key, wherein the shared secret key is stored in encrypted form in the memory of the medical device;
    authenticating, by the medical device, the user by comparing the received response code to the expected response code; and
    resetting, by the medical device, based on the authentication, the account login credentials.

2. The method in accordance with claim 1, wherein generating the challenge code comprises: generating a unique random value; and truncating the unique random value to six digits to generate the challenge code.

3. The method in accordance with claim 1, wherein the predefined time limit is sixty minutes, and wherein resetting, by the medical device, based on the authentication, the account login credentials comprises resetting the account login credentials when (i) the received response code matches the expected response code, and (ii) the elapsed amount of time is less than sixty minutes.

4. The method in accordance with claim 1, wherein generating, by the medical device, the expected response code comprises: retrieving, from the memory, the secret key; combining the retrieved secret key with the generated challenge code; generating a hash message authentication code (HMAC) of the secret key combined with the generated challenge code; and truncating the generated HMAC to six digits to generate the expected response code.

5. The method of claim 1 wherein the medical device is an ablation device adapted to provide an ablation therapy to patients.

* * * * *

UNITED STATES PATENT AND TRADEMARK OFFICE
CERTIFICATE OF CORRECTION

PATENT NO. : 11,397,802 B2
APPLICATION NO. : 16/572393
DATED : July 26, 2022
INVENTOR(S) : Howarth et al.

It is certified that error appears in the above-identified patent and that said Letters Patent is hereby corrected as shown below:

In the Specification

At Column 3, Line number 26, delete "area flow diagram" and replace with --are a flow diagram--.
At Column 3, Line number 34, delete "area flowchart" and replace with --are a flow chart--.
At Column 13, Line number 9, delete "Introducing" and replace with --introducing--.

Signed and Sealed this
Thirtieth Day of August, 2022

*Katherine Kelly Vidal*

Katherine Kelly Vidal
*Director of the United States Patent and Trademark Office*